July 29, 1958 L. W. SEIBERT, JR 2,845,323
CUTLERY CABINET
Filed Nov. 23, 1955
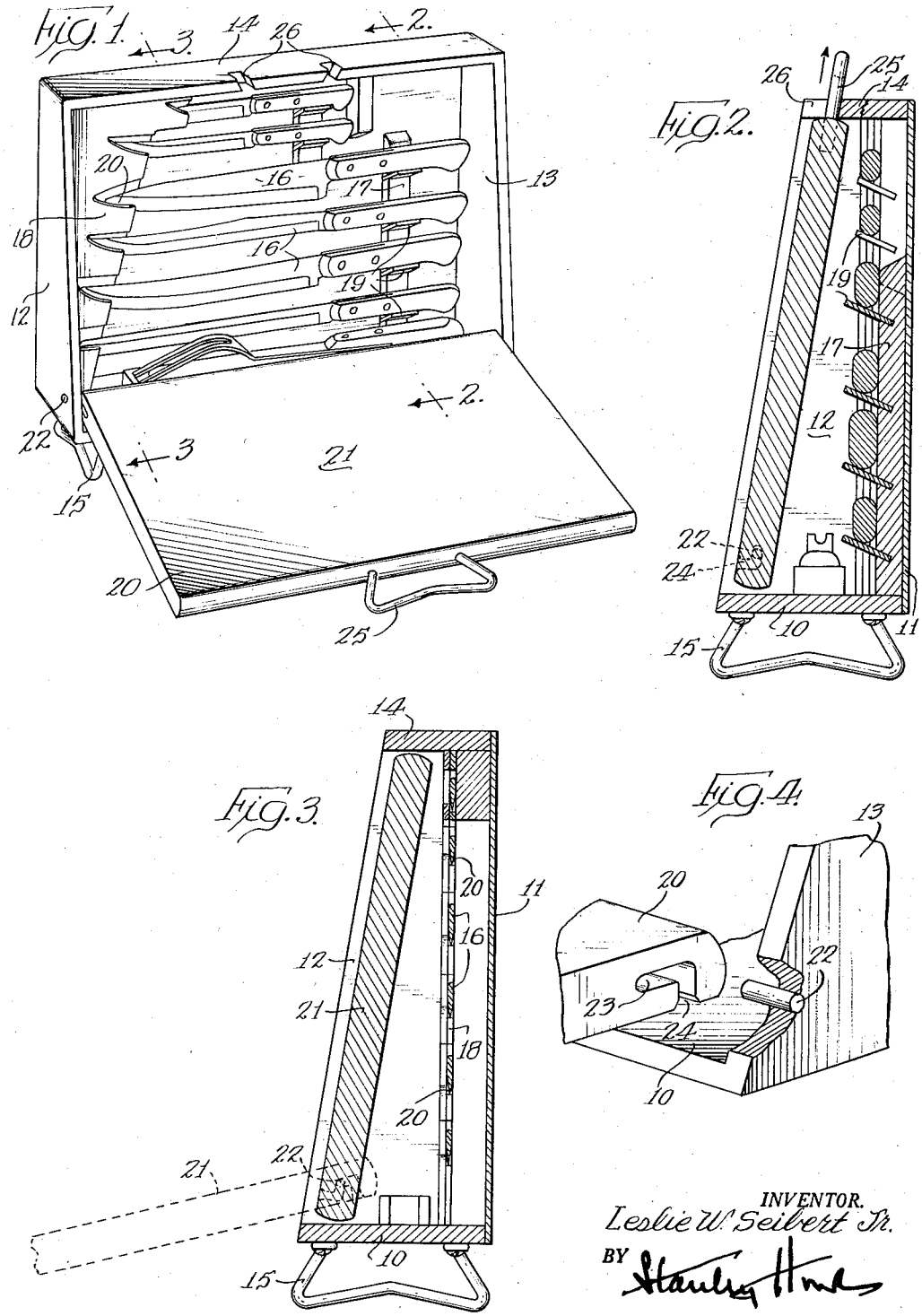
INVENTOR.
Leslie W. Seibert Jr.
BY
Atty.

United States Patent Office 2,845,323
Patented July 29, 1958

2,845,323

CUTLERY CABINET

Leslie W. Seibert, Jr., Northbrook, Ill., assignor to Ekco Products Company, Chicago, Ill., a corporation of Illinois Application November 23, 1955, Serial No. 548,687

3 Claims. (Cl. 312—244)

This invention relates to a case for culinary implements wherein a compartment or holder for the reception and storage of culinary implements, such as slicing and cutting knives, in a convenient and orderly array is combined with a cutting board which is detachably secured thereto to provide a lid for the compartment containing the culinary implements.

More specifically stated, the present invention resides in the details of construction of the cutting board and the case together with the provision of an easily releasable connection between the case and the cutting board.

The above and other objects of the invention will appear more fully from the following more detailed description and by reference to the accompanying drawings forming a part thereof and wherein:

Fig. 1 is a front perspective view of a device embodying the features of the present invention, showing the cutting board in outwardly swung position relative to the case.

Fig. 2 is a vertical section taken on line 2—2 of Fig. 1, as the device in Fig. 1 would appear when the cutting board is in closing relation to the case.

Fig. 3 is a similar section taken in line 3—3 of Fig. 1 and including a fragmentary dotted line portion illustrating the cutting board in outwardly swung position relative to the case.

Fig. 4 is an enlarged fragmentary perspective detail of the connection between the casing and the cutting board.

As shown in the drawings, the case forming the subject of the invention includes a horizontal base 10 and a rear wall 11 rising upwardly from the rear longitudinal edge of the base 10. Reference numbers 12 and 13 represent a pair of side walls rising upwardly from opposite end edges of the base and an upper wall 14 connecting the upper edges of the side walls 12 and 13 and the upper edge of the rear wall 11 cooperate with the base 10 to define a hollow frame in forwardly projecting relation to said rear wall. The base is preferably provided with a pair of supporting legs 15.

A rack adapted to hold a plurality of culinary implements, such as knives 16 shown in Fig. 1, is provided by means of upright supports 17 and 18 secured to the forwardly facing side of the rear wall 11 of the case. A series of pegs 19 are secured to and project forwardly from the support 17 in vertically spaced apart relation corresponding to a series of pockets 20 arranged in vertically spaced apart relation on the support 18 whereby each knife is supported at its handle end by a selected peg 19 while the tip of the blade associated with said handle is seated in a pocket 20 related to said peg. Thus the rack provides means for presenting the knives 16 in an attractive as well as convenient manner.

Reference numeral 21 represents the cover or lid for the case, which is hinged to the end walls 12 and 13 as shown in Fig. 4. The hinged connection thus provided for the lid 21 includes a pin or rod 22 fixed to and projecting horizontally inwardly from the end wall 13 and a similar pin projecting inwardly from the end wall 14 in coaxially aligned relation with the pin 22. The lid is of such peripheral contour as to fit within the framework defined by the end walls 12 and 13 of the case, and the bottom and top walls 10 and 14 respectively. Each of the two opposite edge portions of the lid facing the end walls 12 and 13 of the case is formed with a pocket 23, each pocket being adapted to receive the pin 22 on the end wall opposite thereto whereby said pins 22 form trunnions for rotatably mounting the lid between said walls of the case. Each pocket includes a branch portion 24 which opens from the outer face of the lid and this branch portion 24 provides means through which the corresponding pin 22 on the case has entrance to and exit from its associated pocket 23. Thus the lid may be conveniently applied to or removed from a state of assembled relation to the case. When the lid 21 is in open position and swung into such arrangement as shown in Fig. 1, the inner face of the lid provides a cutting board. As shown in Figs. 2 and 3, the lid, when in closed position, occupies an upwardly and inwardly inclined position relative to the rear wall 11. In this position a handle 25 extending from the upper edge of the lid 21 has rearward engagement with the forwardly facing inner ends of clearance slots 26 which are formed in the upper wall 14 of the case and intersecting the forward edge of said latter wall 14. It will be noted that the slots 26 extend rearwardly of a plane parallel to the rear wall 11 and bisecting the base 10. The portion of the handle projecting upwardly through said slots 26 provides convenient means for carrying the case and when the case is thus suspended by the handle 25, the upper edge of the lid 21 provides a bearing surface engageable by the opposite surface of the upper wall 14 to lift the case.

What is claimed is:

1. A case for culinary implements comprising a horizontal base, a rear wall rising upwardly from said base, opposed upright end walls rising upwardly from said base, an upper wall connecting the upper edges of said end walls and the upper edge of said rear wall, said end walls and upper wall cooperating with said base to define a hollow frame in forwardly projecting relation to said rear wall with the forward edges thereof in rearwardly and upwardly inclined relation to said base, a lid forming a closure for such case and of such peripheral contour as to fit within the area bounded by said base, upper and end walls when in closing relation to said case, said upper wall having a slot extending rearwardly from the forward edge thereof and rearwardly of a plane parallel to said rear wall and bisecting said base, a handle projecting upwardly from the edge of the lid facing said upper wall of the case in which slot said handle has clearance for engagement with the rear limits of said slot whereby the case is adapted to be lifted by said lid in response to lifting force applied to said handle, and a conection between said lid and said case about which said lid may be rocked between an upright position within the confines of said base, upper and end walls and a reclined position in forwardly extending relation to said base, and forwardly facing means on said rear wall for the reception and storage of a plurality of culinary implements in spaced apart relation.

2. A case for culinary implements in accordance with claim 1 wherein the connection between the lid and the case includes a pin extending inwardly from one of said end walls and a similar pin extending inwardly from the opposite end wall in axial alignment with said first pin, and a pocket formed in each of the opposite edge portions of the lid facing said end walls and in which pockets said pins are engageable.

3. A case for culinary implements in accordance with claim 2 wherein each of said pockets includes a branch portion which opens from the outer face of the lid and said branch portion provides means through which the corresponding pin has entrance to and exit from the associated pocket.

References Cited in the file of this patent

UNITED STATES PATENTS

| | | |
|---|---|---|
| 351,183 | Legg | Oct. 19, 1886 |
| 544,817 | Luigart | Aug. 20, 1895 |
| 628,361 | Shank | July 4, 1899 |
| 1,351,654 | Jobling | Aug. 31, 1920 |
| 2,258,582 | Berg | Oct. 14, 1941 |
| 2,267,891 | Baker | Dec. 30, 1941 |
| 2,515,338 | Colegrove | July 18, 1950 |
| 2,683,642 | Stoleson | July 13, 1954 |